April 3, 1956  A. D. DAVIES  2,740,957
COLORED FILTER BLOCKS
Filed Jan. 19, 1954 2 Sheets-Sheet 1

INVENTOR.
ALAN D. DAVIES
BY
G. D. O'Brien
H. W. Leach ATTYS

April 3, 1956  A. D. DAVIES  2,740,957
COLORED FILTER BLOCKS
Filed Jan. 19, 1954  2 Sheets-Sheet 2

INVENTOR.
ALAN D. DAVIES
BY
*G. D. O'Brien*
*H. H. Losch* ATTYS

# United States Patent Office 2,740,957
Patented Apr. 3, 1956

2,740,957

COLORED FILTER BLOCKS

Alan D. Davies, Pennsauken, N. J., assignor, by mesne assignments, to the United States of America as represented by the Secretary of the Navy Application January 19, 1954, Serial No. 405,057

4 Claims. (Cl. 340—380)

The present invention relates to a colored lighting device or colored filter block. More particularly this invention relates to a device for controlling the color of an indicating light such as might be used on an instrument panel in an aircraft. In such use it is highly desirable to restrict the intensity of illumination within the cockpit while it is still necessary to have some indicating devices illuminated. It therefore becomes desirable to have those devices illuminated as an area of relatively low intensity rather than as a spot of high intensity, where the area compensates for the low intensity in providing the required visibility. The most efficient use of a given area at a given intensity requires that the entire area be substantially uniformly illuminated. This invention satisfies these requirements.

An object of the present invention is to provide a means for producing colored lights.

Another object is to provide a means for producing from a plurality of sources an area of colored light having substantially a uniform level of illumination from each source.

Other objects and features of the invention will become apparent to those skilled in the art as disclosure is made in the following detailed description of a preferred embodiment of the invention as illustrated in the accompanying drawings in which.

The invention illustrated in the above described drawings provides a colored indication in which the color, uniformity of illumination, and intensity may be controlled. The coloring of the light is accomplished by providing a plurality of prismatic light-transmitting elements of variously colored transparent plastic, each of which has an individual source of illumination whose light is constrained to pass through the one block only. The uniformity of illumination is achieved by combining the colored and a clear plastic in a design which utilizes the difference in the light attenuation properties of the colored and clear plastic. At will appear more clearly in the following discussion, control of the relative lengths of the light paths through the two plastics from the source to the illuminated surface is utilized to produce a uniform illumination over the whole area of the surface. The intensity of the illumination is controlled by introducing in the light path translucent material which has a high light attenuating value.

Figure 1:
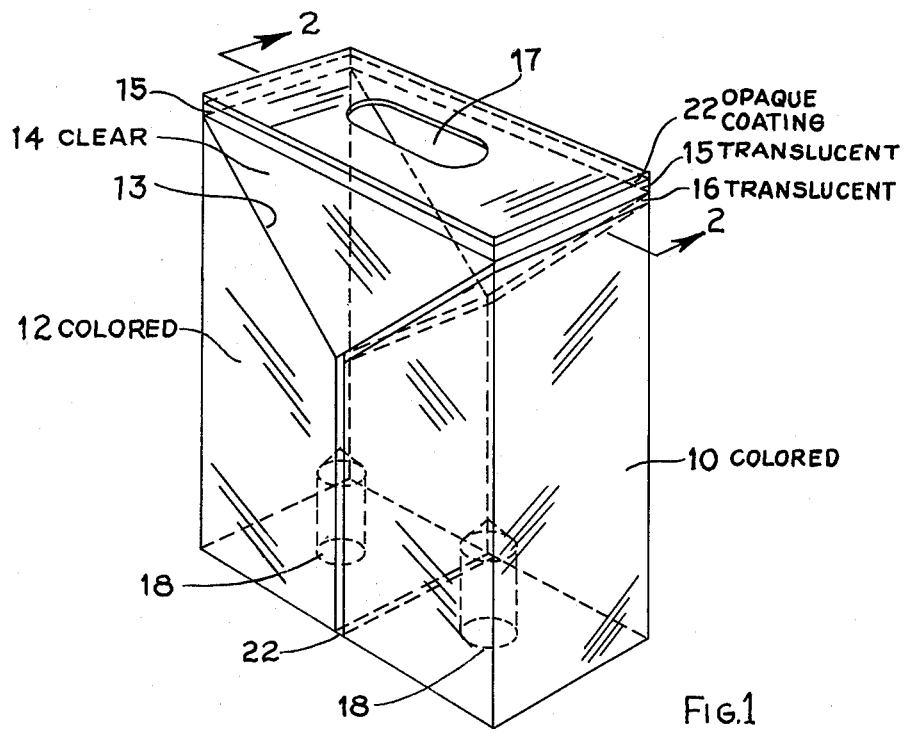
Figure 1 is a perspective view of the device having two colored blocks.
Figure 2:
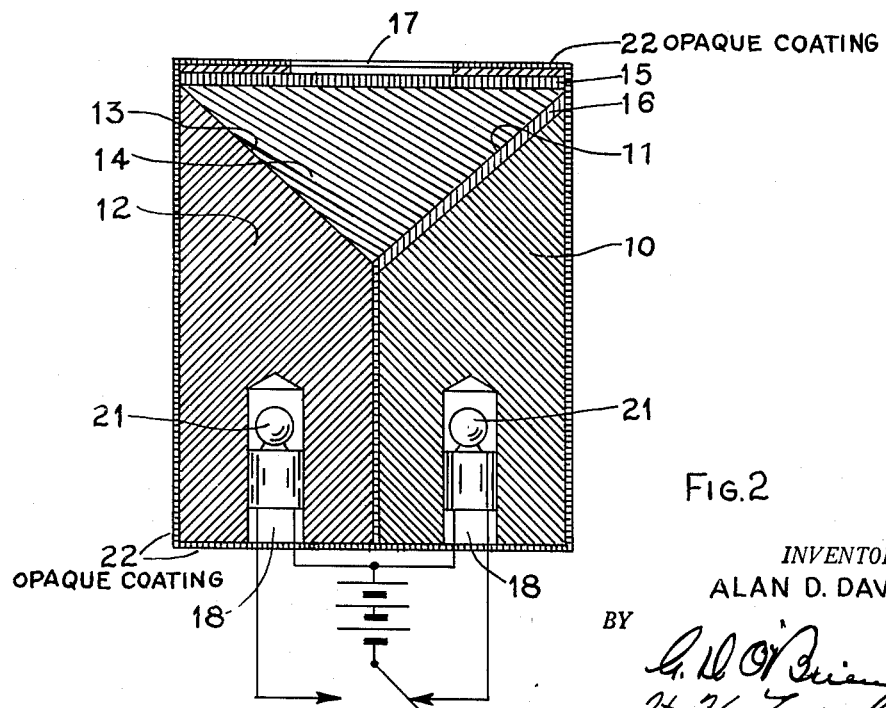
Figure 2 is a longitudinal cross section of Figure 1 along line 2—2.

Referring now to the drawings, wherein like reference characters designate like or corresponding parts throughout the several views, there is shown in Figure 1 an embodiment of the invention which consists of a plurality of blocks of colored light-transmitting plastic material assembled to selectively transmit light of the various colors through a common surface. Each of the colored blocks is of a transparent colored plastic as shown in the illustration by blocks 10 and 12. The block 10, in the illustration, is of polygonal cross section and has a bore 18 in one end of it to receive a light source 21. The opposite end of the block 10 has an inclined plane end 11. A second block 12 is of a different colored material, but is similar in construction to the block 10 and is mounted with one side in contact with one side of block 10 and with its inclined plane end 13 opposed to inclined plane end 11 of block 10. When the two blocks are mounted together the light in one is not transmitted through to the other because of mutual filtering of the other color light. A third block 14 is prismatic in form and is mounted with two of its faces in contact with the inclined plane ends 11 and 13 of blocks 10 and 12, respectively. This prismatic block is of a clear plastic material and as shown in Figure 1 of the drawing, has a plane face that lies in a plane perpendicular to the bores 18. The three blocks, after mounting, are coated on all sides, except the surface through which the light is received and the surface through which it is radiated, with the opaque material 22. It is to be understood that the window through which the light is radiated may be masked by opaque coating 22 to form any desired pattern. A fourth block or sheet 15 of plastic material of a translucent nature may if desired by placed over the exposed side of the third block to diffuse the light transmitted by the third block. This would usually be placed on the exposed surface of block 14 before any mask is applied.

When it is desired to regulate the intensity of illumination transmitted through the various colored blocks to the window 17 to a predetermined level, a sheet 16 of a translucent material of a suitable thickness is attached over the inclined face of such of the blocks as required to attenuate the light from such blocks to said level. The thickness of this sheet of material is chosen to compensate for the varying degrees of absorption in the several blocks of colored plastic and is adjusted in thickness to give the required degree of attenuation of the light through each block to result in a uniform light level for all colors at the surface 17 of block 15.

The particular construction of this device also facilitates uniform illumination throughout the surface 17 because the light passing througs the colored blocks is attenuated to a greater extent than the light passing through the clear block. That is, the length of straight lines from the light source 21 to different points on inclined plane end 13, for example, are different and light attenuation at the different points is different. But note that the distance from points of low level light, near the top of the incline, to the window is less than the distance to the window from points near the bottom of the incline. Thus the inclined plane ends 11 or 13 of the blocks permit the varying length of the light path from the various blocks to all points of the surface 17 to be compensated for by controlling the relative lengths of the path through the colored and the clear plastic.

Figure 3:
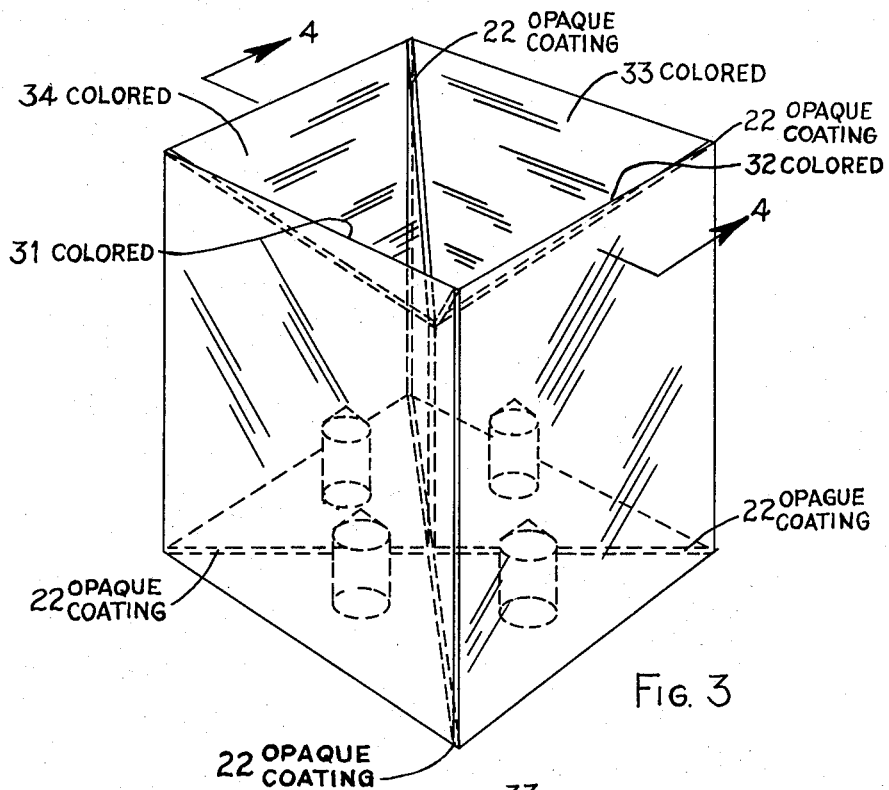
Figure 3 is a perspective view of the device having four colored blocks.
Figure 4:
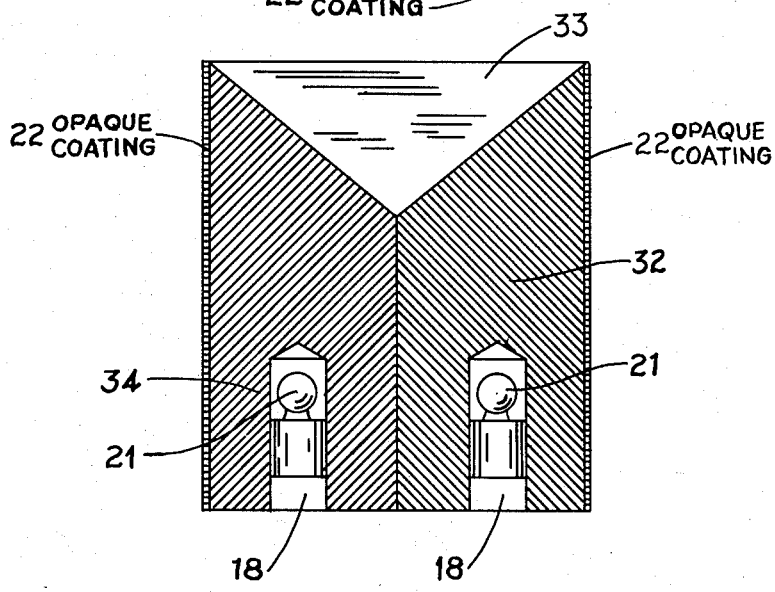
Figure 4 is a sectional view taken along 4—4 of Figure 3.

It will be readily understood that if three or more colored blocks are to be utilized, the blocks will be prismatic in form with an angularly truncated end face and would be mounted with a common line of joinder and with the truncated faces coterminous. Such an arrangement is shown in Figures 3 and 4 of the drawings wherein it can be seen that colored blocks 31, 32, 33, and 34 are mounted with a common line of joinder.

What is claimed is:

1. A device for producing a plurality of colors for an indicator light comprising a plurality of blocks of colored transparent plastic material corresponding to the desired plurality of colors, each having two ends and a plurality of sides, each of said blocks having a bore extending from one end and of sufficient depth to receive a light source, each of said blocks being coated externally on the sides with an opaque material, said plurality of blocks being secured together with said bores extending from the same end and in parallel relationship and with a common line of contact, the plane end opposite said bore in each block having its surface inclined toward said common line of contact in opposed relation to the inclined surface of each other said blocks, a block of uncolored transparent plastic having a plane face on one side and a plurality of faces which are secured to and conform to the inclined faces of said colored blocks, said plane face being in a plane perpendicular to said bores whereby light rays from said light source passing through said blocks are attenuated due to the different lengths of straight-line paths that said light rays travel in through said blocks, thereby giving uniform illumination to said plane face, and means for regulating the intensity of said light rays emitting from said plane face.

2. A device as claimed in claim 1, wherein said means for regulating the intensity of said light rays emitting from said plane face comprises sheets of translucent material introduced between said inclined ends of said colored blocks and said surfaces of said uncolored transparent block, said sheets being of suitable thickness to attenuate the light passing through each block to provide a substantially uniform level of illumination from all said blocks on said translucent sheet on said plane face.

3. A device as set forth in claim 1 wherein said means for regulating the intensity of said light rays emitting from said plane face comprises a thin sheet of translucent material secured over the plane face of said uncolored transparent block.

4. A device for producing uniformly illuminated colors for an indicator light comprising; first and second colored blocks, each having four sides and two ends, said second block being of different color than said first block and having one side in contact with one side of said first block, each of said blocks having a bore extending from one end and of sufficient depth to receive a light source, the plane end opposite said bore in each block having its surface inclined toward said common line of contact of said first and second blocks whereby said inclined ends are opposed one another; a third block of uncolored transparent plastic, prismatic in form and having a plurality of faces, with two of said faces being in contact with said inclined ends respectively of said first and second blocks, and another face being in parallel alignment with said bored ends of said first and second block, whereby light rays from said light source passing through said blocks are attenuated due to the different lengths of straight-line paths that said light rays travel in through said blocks, thereby giving uniform illumination to said face on said third block that is in parallel alignment with said bored ends of said first and second blocks.

References Cited in the file of this patent
UNITED STATES PATENTS 2,374,408     Braidwood  ------------ Apr. 24, 1945
2,589,569     Peter  ---------------- Mar. 18, 1952